Oct. 14, 1947.   J. R. SNYDER   2,429,140
SHOCK ABSORBER
Filed Oct. 13, 1943
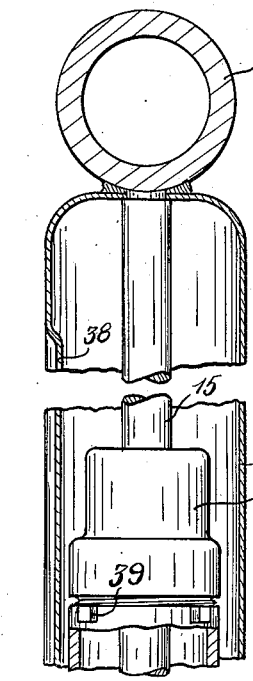
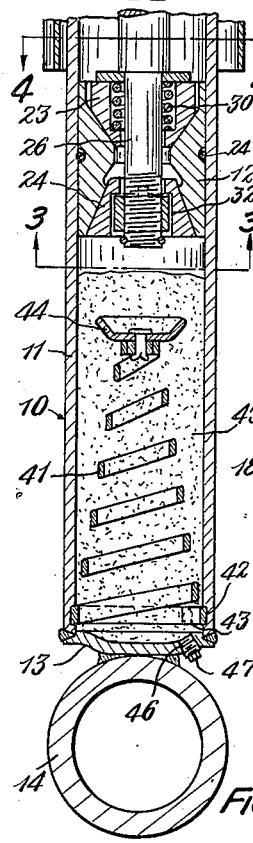
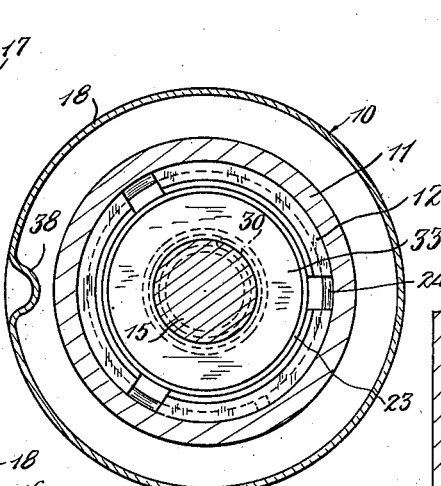
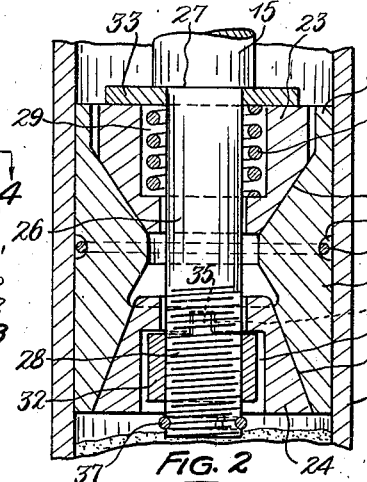
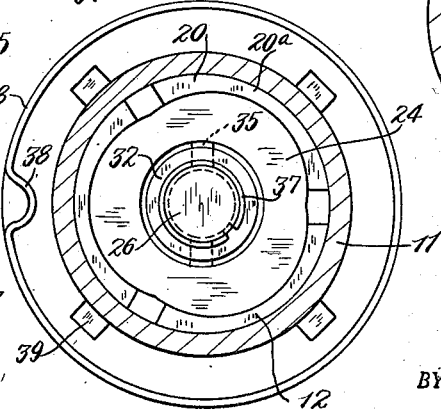
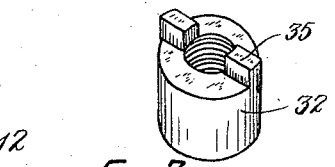
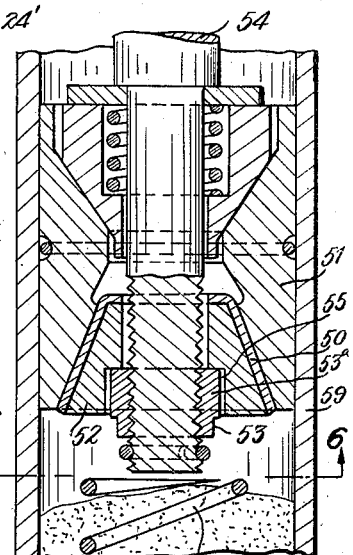
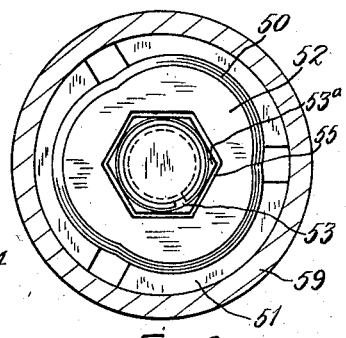
INVENTOR.
BY JACOB RUSH SNYDER
Kwis Hudson Boughton & Williams
ATTORNEYS Patented Oct. 14, 1947

2,429,140

UNITED STATES PATENT OFFICE 2,429,140

SHOCK ABSORBER

Jacob Rush Snyder, Cleveland, Ohio, assignor to Thompson Products, Inc., Cleveland, Ohio, a corporation of Ohio Application October 13, 1943, Serial No. 506,062

7 Claims. (Cl. 267—9)

This invention relates to shock absorbers and aims to provide novel means by which the operating characteristics of a shock absorber can be quickly and easily adjusted from the outside of the device.

Another object of the invention is to provide an improved shock absorber of the kind having friction means therein and an actuating member projecting from the device, and wherein novel means is provided whereby adjustment of the friction means can be made from the exterior of the device by a predetermined movement of the actuating member.

A further object of my invention is to provide an improved direct acting shock absorber having retarding means adapted to be adjusted by relative rotation between the actuating rod and casing and in which novel means is employed for preventing such relative rotation while the device is in the collapsed condition in which direct actuating shock absorbers are usually shipped and handled prior to installation.

The invention can be further briefly summarized as consisting in certain novel combinations and arrangements of parts hereinafter described and particularly set out in the appended claims.

In the accompanying sheet of drawings:

Fig. 1 is a longitudinal sectional view taken through a shock absorber embodying my invention.

Fig. 2 is a similar longitudinal sectional view taken through the retarding unit of the shock absorber and showing the same on a larger scale.

Fig. 3 is a transverse sectional view of the device taken on line 3—3 of Fig. 1.

Fig. 4 is another transverse sectional view thereof taken on line 4—4 of Fig. 1.

Fig. 5 is a longitudinal sectional view taken through the retarding means of a modified form of my improved shock absorber.

Fig. 6 is a transverse sectional view thereof taken on line 6—6 of Fig. 5, and

Fig. 7 is a perspective view showing the adjusting and retaining nut of the retarding unit in detached relation.

For a more detailed description of my invention reference will first be made to Fig. 1 in which I show a shock absorber 10 having an elongated tubular casing or cylinder 11 and a retarding unit 12 reciprocable in such casing. One end of the casing 11, in this instance the lower end, is closed by means of a cover or plate 13 having thereon a ring or eye 14 by which the casing can be connected with one of a pair of relatively movable parts to be retarded. An actuating rod 15 projects from the other end of the casing through a closure 16 which contains a suitable bearing and seal for such rod. The inner end of the rod 15 is connected with the retarding unit 12 and its outer end carries a ring or eye 17 which is adapted to be connected with the other of said pair of relatively movable parts. A guard 18 in the form of a sleeve is movable with the actuating rod 15 and extends in surrounding telescoping relation to the casing 11.

In the shock absorber herein illustrated the retarding unit 12 is a friction unit having an expansible sleeve 20 in frictional engagement with the wall of the casing 11. The sleeve 20 comprises a group of segments 20a molded or otherwise formed from a material which will provide a satisfactory coefficient of friction. The segments 20a are shaped to provide the friction sleeve with tapered faces 21 and 22 internally thereof and adjacent its opposite ends. The friction unit 12 also includes tapered expanders 23 and 24 which extend into opposite ends of the friction sleeve 20 and have wedging cooperation respectively with the tapered surfaces 21 and 22. The expander 24 has a non-circular or lobular external contour as shown in Fig. 3 to which further reference will presently be made, and the tapered surface 22 of the sleeve 20 is of a similar non-circular or lobular contour.

A spring ring 24' surrounding the friction sleeve 20 and lying in the groove 25 thereof normally tends to release or lessen the frictional engagement of the segments 20a with the wall of the casing 11.

The inner end of the actuating rod 15 has a reduced stem 26 thereon which extends axially through the sleeve 20 and the expanders 23 and 24. The stem 26 provides a shoulder 27 adjacent the expander 23 and has a threaded portion 28 adjacent the expander 24. The expander 23 has a recess 29 therein in which is located a compression spring 30 and the expander 24 has a similar recess 31 having therein a nut 32 through which the threaded section 28 of the rod 15 extends. A washer 33 surrounding the stem 26 and engaging the shoulder 27 forms a seat for the spring 30. The compression spring 30, acting on the expander 23 directly and on the expander 24 through the rod 15 and the nut 32, urges the expanders toward each other to produce an initial expansion of the sleeve 20 so that the unit 12 will have a desired initial frictional drag on the wall of the casing 11. The nut 32 retains the retarding unit 12 on the actuating rod 15 and also forms a part of my novel adjusting means which will be presently described.

In the operation of the shock absorber 10 as thus far described, the occurrence of relative movement, and particularly a sudden relative movement, between the casing 11 and rod 15 will cause one or the other of the expanders 23 and 24, depending upon the direction of such relative movement, to further expand the sleeve 20 and produce an increased frictional drag on the wall of the casing. Such increased frictional drag provides a desired retarding and shock absorbing function.

An important feature of my invention is the means by which the effectiveness of the retarding unit 12 can be quickly and easily adjusted from the exterior of the device and without requiring complete disconnection from the vehicle or other apparatus upon which it is mounted. For purposes of such adjustment provision is made for holding the nut 32 against turning so that by rotating the rod 15 in one direction or the other the compression of the spring 30 can be varied for correspondingly increasing or decreasing the initial frictional drag of the sleeve 20 on the wall of the casing. To this end the nut 32 has a projecting tongue or rib 35 which engages in a transverse slot 36 of the expander 24. The expander 24 being of a non-circular or lobular shape as shown in Fig. 3 and described above, is held against turning by the friction sleeve 20 which is, itself, held against turning by its frictional engagement with the casing 11.

The holding of the nut 32 against rotation thus permits the actuating rod 15 to be rotated relative to the casing 11 for adjusting the operating characteristics of the retarding unit 12. When the rod 15 is rotated in a direction to advance the same farther through the nut 32, the compression of the spring 30 is increased, thereby causing the expanders 23 and 24 to produce greater initial expansion of the friction sleeve 20. When the rod 15 is rotated in the opposite direction tending to unscrew the same from the nut 32 the compression of the spring 30 is reduced and the initial expansion of the sleeve 20 is decreased and the retarding effect of the unit 12 is correspondingly reduced. A snap ring 37 engaging in a groove adjacent the end of the rod 15 prevents complete disengagement of the rod 15 from the nut 32.

When the shock absorber is being shipped or handled prior to its being mounted on a vehicle or other apparatus, it is desirable to prevent rotation of the rod 15 relative to the casing 11 so that the adjustment of the retarding unit 12 will not be unintentionally altered. Usually the retarding unit 12 will be accurately adjusted at the factory for the particular kind of service or make of vehicle with which the shock absorber is to be used, and by preventing relative rotation between the rod 15 and the casing 11 during subsequent shipping or handling of the device such adjustment will not be disturbed. For preventing such relative rotation between the actuating rod and casing I provide an axially extending rib 38 on the sleeve or guard 18 and two or more projections 39 on the casing 11 for cooperation with such rib. Since shock absorbers of this kind are usually in a collapsed condition while being shipped or handled prior to installation, the rib 38 will cooperate with the stop means provided by the projections 39 and prevent relative rotation of the rod 15. When the device has been installed the eyes 14 and 17 of the casing and rod are connected respectively with the pair of parts to be retarded and such connections will subsequently prevent relative rotation between the rod 15 and the casing 11 while the device is in operation.

When adjustment of the retarding unit 12 is to be made, it is only necessary to disconnect one end of the shock absorber from the vehicle or apparatus with which it is being used, whereupon the casing 11 and rod 15 can be relatively extended so as to disengage the rib 38 from the projections 39, thereby permitting relative rotation between the rod and the casing. Usually the upper end of the shock absorber will be disconnected and the rod 15 withdrawn from the casing a sufficient distance to disengage the rib 38 from the projections 39 to permit the desired relative rotation of the actuating rod. After the adjustment of the retarding unit 12 has been made, the shock absorber is collapsed to the extent necessary to reconnect the same to the apparatus with which it is being used.

The shock absorber 10 may also be provided with a compression spring 41 in the closed end thereof which is adapted to be engaged by the retarding unit 12 upon the occurrence of excessive inward relative movement of the rod 15 and prevents "bottoming" of the retarding unit or the actuating rod in the casing 11. For holding the spring 41 in proper place in the casing 11 I provide the latter with an internal annular groove 42 adjacent its closed end in which the end convolution 43 of the spring engages. The provision of the groove 42 permits the spring 41 to be quickly assembled and held in proper position without requiring welding or other means for anchoring it in the casing. The spring 41 is a helically wound tapered spring and is provided at its upper end with a cup element 44 for engagement with the expander 24. When the retarding unit 12 is moved inwardly a sufficient distance to bring the expander 24 into engagement with the cup element 44 this element will span the lower end of the rod 15 and will act only on the expander 24 causing the latter to further expand the friction sleeve 20 and increase the frictional drag on the wall of the casing.

The casing 11 of the shock absorber here illustrated may also contain a quantity of loose dry lubricating powder 45 which serves to render the operation of the shock absorber smooth and efficient. During the period of use of a friction shock absorber containing such powder it is desirable at times to renew or replenish the supply of powder in the device. For this purpose I provide the casing 11 with an opening 46 in the lower end thereof through which used powder can be removed from the casing by the use of suction or other suitable means and a supply of new or additional powder can be suitably introduced into the casing. The opening 46 can be closed by a removable screw plug 47.

In Figs. 5 and 6 of the drawings I show a modified form of my improved shock absorber in which the expander 50 of the retarding unit 51 is in the form of a cup-shaped lobular sheet metal stamping and contains a filler 52 of a corresponding shape with which the nut 53 of the actuating rod 54 cooperates. The filler 52 has a non-circular, for example hexagonal, recess 55 therein and the nut 53 has a portion 53a of a corresponding shape engaging in such recess for holding the nut stationary while the rod 54 is being retarded for adjusting the characteristic of the retarding unit 51.

A compression spring 58 is provided in the lower end of the casing or cylinder 59 for cooperation with the expander 52 and serves the same purpose as the spring 41 above described. The upper end of the spring 58 is of a diameter such that it can engage the expander 52 without engaging the nut 53 or the rod 54. The outer end of the nut 53 is preferably round so as to freely enter the spring 58. In other respects the shock absorber shown in Figs. 5 and 6 is substantially identical with the device shown in Fig. 1.

From the foregoing description and the accompanying drawing it will now be readily understood that I have provided an improved shock absorber embodying novel means by which the operating characteristics of the device can be varied or adjusted without requiring the device to be opened or taken apart. It will be seen furthermore that the adjusting means provided in my improved shock absorber permits the device to be accurately adjusted at the factory and prevents such adjustment from being changed or disturbed during the handling or shipping of the device prior to its final installation. With the improved construction which I have provided and described above, it will also be seen that a desired adjustment of the shock absorber can be easily and quickly made at any time after installation.

Having thus described my invention, I claim:

1. In a friction shock absorber, a casing, an expansible unit axially movable in said casing and comprising a friction sleeve and an expander in said sleeve for expanding the sleeve into frictional engagement with the wall of the casing, said sleeve and expander having cooperating lobular portions preventing relative rotation therebetween, an actuating rod extending into the casing and connected with said unit, an adjustable connection between said expansible unit and rod and located wholly within said unit and responsive to relative rotation between said casing and rod for varying the frictional cooperation between said unit and casing, and cooperating rib and stop elements for preventing said relative rotation between said rod and casing during shipping or handling of the shock absorber but permitting such relative rotation when said actuating rod has been extended to an abnormal position relative to the casing in which said rib and stop elements are disengaged from each other, one of said elements being carried by said casing and the other being connected with said rod for axial movement therewith.

2. In a friction shock absorber, a casing, an expansible unit axially movable in said casing and comprising a friction sleeve and an expander in said sleeve for expanding the sleeve into frictional engagement with the wall of the casing, a compression spring in said unit for urging said expander in a direction to expand said sleeve, said sleeve and expander having cooperating lobular portions preventing relative rotation therebetween, an actuating rod extending into the casing and connected with said unit, an adjustable connection between said expansible unit and rod and located wholly within said unit and responsive to relative rotation between said rod and casing for altering the compression of said spring to vary the frictional cooperation between said unit and casing, and cooperating rib and stop elements for preventing said relative rotation between said rod and casing during shipping or handling of the shock absorber but permitting such relative rotation when said actuating rod has been extended to an abnormal position relative to the casing in which said rib and stop elements are disengaged from each other, one of said elements being carried by said casing and the other being connected with said rod for axial movement therewith.

3. In a friction shock absorber, an elongated casing, a friction unit reciprocable in said casing, an actuating rod connected with said unit and projecting from said casing, a sleeve movable with said rod in telescoping relation to said casing and having an axially extending rib thereon, means embodied in said friction unit and responsive to relative rotation between said rod and unit for varying the effectiveness of the latter, and projecting stop means on said casing cooperating with said rib for preventing said relative rotation during shipping or handling of the shock absorber, said rib being movable to a position disengaged from said stop means so as to permit relative rotation between said rod and casing when the rod is withdrawn to an abnormal position relative to the casing.

4. In a shock absorber, an elongated casing, an expansible unit reciprocable in said casing in frictional engagement with the wall thereof and comprising a friction sleeve and an expander in said sleeve, said sleeve and expander having cooperating lobular portions preventing relative rotation therebetween, a compression spring in said unit for producing an initial expansion thereof, a rod extending into said casing for actuating said unit, said rod having threaded connection with said unit so that relative rotation of the rod will alter the compression of said spring for varying the frictional cooperation of said unit with the casing, a tubular member movable with said rod in telescoping relation to said casing and having an axially extending rib thereon, and projecting stop means on said casing adapted to cooperate with said rib for preventing said relative rotation during shipping or handling of the shock absorber but permitting such relative rotation when said rod and tubular member have been extended to an abnormal position relative to said casing in which said rib and stop means are disengaged from each other.

5. In a friction shock absorber, a casing, a reciprocable unit in said casing comprising an expansible sleeve in frictional engagement with the wall of the casing and a pair of tapered expanders engaging in said sleeve for expanding the same, an actuating rod extending axially of said unit and projecting from said casing, said rod having a shoulder thereon adjacent one expander and a threaded portion adjacent the other expander, said other expander and sleeve having cooperating lobular portions preventing relative rotation therebetween, a spring between said shoulder and said one expander for producing an initial expansion of said sleeve, said other expander having a recess therein, and a nut engaging in the recess of said other expander and held against rotation, said nut cooperating with said threaded portion so that rotation of said rod will vary the compression of said spring.

6. In a friction shock absorber, an elongated casing, a retarding unit reciprocable in said casing and comprising an expansible sleeve and a tapered expander for expanding the sleeve into frictional engagement with the wall of said casing, said sleeve and expander having cooperating lobular portions preventing relative rotation therebetween, a compression spring in said unit for producing an initial expansion of said sleeve, a nut having a tongue and groove connection with said lobular expander and being held by the latter against rotation, an actuating rod extending into said casing and unit and cooperating with said nut so that relative rotation of the rod varies the compression of said spring, a tubular member movable with said rod in telescoping relation to said casing, and cooperating elements on said casing and tubular member for preventing relative rotation therebetween during shipping or handling of the shock absorber but being disengageable from each other so as to permit such relative rotation between the casing and rod when the rod has been withdrawn to an abnormal position relative to the casing.

7. In a friction shock absorber, an elongated casing, a friction unit reciprocable in said casing and comprising an expansible friction sleeve and an expanding means in said sleeve for expanding the same, said sleeve and expander having cooperating lobular portions preventing relative rotation therebetween, an actuating rod extending through said expanding means, means adjustably connecting said rod with said expanding means, said rod projecting from one end of said casing, a tapered spring in the other end of said casing, said spring having large and small ends and being disposed with its small end extending towards said unit, and a cup element carried by the small end of said spring and adapted to engage said expanding means while spanning the adjustable connection of said rod with said expanding means.

JACOB RUSH SNYDER.

REFERENCES CITED

The following references are of record in the file of this patent:

UNITED STATES PATENTS

| Number | Name | Date |
| --- | --- | --- |
| 2,404,666 | Snyder | July 23, 1946 |
| 2,373,508 | Snyder | Apr. 10, 1945 |
| 2,196,089 | Wallace | Apr. 2, 1940 |
| 2,205,586 | Williams | June 25, 1940 |
| 1,866,167 | Lolley | July 5, 1932 |
| 1,292,539 | Todd | Jan. 28, 1919 |
| 1,689,903 | Wise | Oct. 30, 1928 |
| 1,747,238 | Gross | Feb. 18, 1930 |
| 2,237,318 | Snyder | Apr. 8, 1941 |
| 2,212,759 | Tea | Aug. 27, 1940 |

FOREIGN PATENTS

| Number | Country | Date |
| --- | --- | --- |
| 384,173 | Great Britain | Dec. 1, 1932 |
| 620,246 | France | Apr. 19, 1927 |
| 843,992 | France | Apr. 11, 1939 |